(12) United States Patent
Huang et al.

(10) Patent No.: US 8,669,508 B2
(45) Date of Patent: Mar. 11, 2014

(54) SUN-TRACKING SYSTEM

(75) Inventors: Yen-Wei Huang, New Taipei (TW);
Hong-Yih Yeh, Taoyuan County (TW);
Cheng-Dar Lee, Tainan (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 330 days.

(21) Appl. No.: 13/225,780

(22) Filed: Sep. 6, 2011

(65) Prior Publication Data

US 2012/0097836 A1    Apr. 26, 2012

(30) Foreign Application Priority Data

Oct. 21, 2010 (TW) .............................. 99135881 A

(51) Int. Cl.
*G01J 1/20* (2006.01)

(52) U.S. Cl.
USPC ..................................................... 250/203.4

(58) Field of Classification Search
USPC ................ 250/203.4; 136/246, 259; 126/578; 356/139.01
See application file for complete search history.

(56) References Cited

U.S. PATENT DOCUMENTS

| | | | |
|---|---|---|---|
| 7,507,941 B2 * | 3/2009 | Yeh et al. | 250/203.4 |
| 7,910,870 B2 * | 3/2011 | Yeh et al. | 250/203.4 |
| 8,247,753 B2 * | 8/2012 | Hong et al. | 250/203.4 |
| 2008/0066735 A1 * | 3/2008 | Yeh et al. | 126/578 |
| 2010/0275903 A1 * | 11/2010 | Yeh et al. | 126/578 |

* cited by examiner

*Primary Examiner* — Seung C Sohn
(74) *Attorney, Agent, or Firm* — Jackson IPG PLLC

(57) ABSTRACT

A sun-locating apparatus includes a substrate, a mounting unit, a photo-detecting unit, an optical element and a cover. The mounting unit is provided on the substrate and formed with an upper aperture and a lower aperture in communication with the upper aperture. The photo-detecting unit is located in the lower aperture. The photo-detecting unit includes at least four photodiodes. The optical element is provided on the mounting unit for covering the upper aperture. The cover is provided on the substrate for covering the mounting unit, the photo-detecting unit and the optical element.

9 Claims, 4 Drawing Sheets

SUN-TRACKING SYSTEM

BACKGROUND OF INVENTION

1. Field of Invention

The present invention relates to a sun-tracking system and, more particularly, to a precise, compact sun-locating apparatus of a sun-tracking apparatus.

2. Related Prior Art

A concentration-type photovoltaic system operates at a higher efficiency than a conventional photovoltaic system. A concentration-type photovoltaic system must however be equipped with a sun-tracking system for efficient generation. The efficiency of the concentration-type photovoltaic system is determined by the precision of the sun-tracking system. The core of the sun-tracking system is a sun-locating apparatus.

A conventional sun-locating apparatus 6 includes a plate 61, a post 62 provided on the plate 61 and four photodiodes 63 provided on the plate 61. The photodiodes 63 are positioned to the east, west, south and north of the post 62. When sun light is cast on the sun-locating apparatus 6, the shadow of the post 62 appears on the plate 61, thus producing a potential difference between the photodiodes 63. The photodiodes 63 positioned to the east and west of the post 62 determine whether a photovoltaic system equipped with the sun-locating apparatus 6 is aligned to the sun regarding the east and west. The photodiodes 63 positioned to the south and north of the post 62 determine whether photovoltaic system is aligned to the sun regarding the south and north. If so, a photo voltaic system is rotated until the potential differences are gone, i.e., the photovoltaic system is aligned to the sun.

The sun-locating system 6 however exhibits several drawbacks. At first, the resolution or precision of the sun-locating system 6 is in proportion to the height of the post 62. Hence, it is difficult to miniaturize the sun-locating system 6.

Secondly, the precision of the sun-locating system 6 is easily affected by clouds. When the sun is shielded by a cloud, the shadow of the cloud appears on the plate 61 as well as the shadow of the post 62. Thus, the precision of the sun-locating system 6 is affected. Moreover, when the sun light is weak, the precision of the sun-locating system 6 is affected too.

Thirdly, differences between the photodiodes 63 also jeopardize the precision of the sun-locating system 6. The photodiodes 63 are supposed to be identical to one another; however, they are, in practice, different from one another regarding their photo-electric properties.

The present invention is therefore intended to obviate or at least alleviate the problems encountered in prior art.

SUMMARY OF INVENTION

It is the primary objective of the present invention to provide a precise, compact sun-locating apparatus.

To achieve the foregoing objectives, the sun-locating apparatus includes a substrate, a mounting unit, a photo-detecting unit, an optical element and a cover. The mounting unit is provided on the substrate and formed with an upper aperture and a lower aperture in communication with the upper aperture. The photo-detecting unit is located in the lower aperture. The photo-detecting unit includes at least four photodiodes. The optical element is provided on the mounting unit for covering the upper aperture. The cover is provided on the substrate for covering the mounting unit, the photo-detecting unit and the optical element.

The substrate may be a circuit board formed with a circuit layout.

The sun-locating apparatus may further include a signal-transmitting wire connected to the substrate.

The mounting unit may include an upper disc and a lower disc provided beneath the upper disc. The upper aperture is defined in the upper disc while the lower aperture is defined in the lower disc.

The upper aperture may be made with a diameter of 1.5 mm.

The photo-detecting unit may be made with a diameter twice as long as that of the upper aperture.

The photodiodes are substantially identical to one another regarding their photoelectric properties.

The optical element may be a concentration lens.

The cover may be made of a transparent material.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
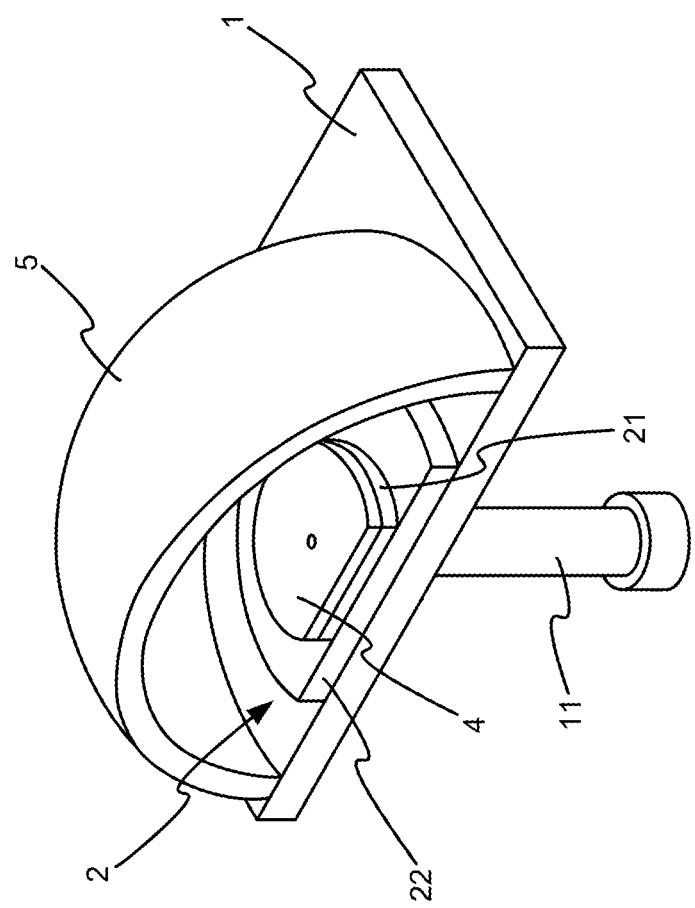
FIG. 1 is a cut-away view of a sun-locating apparatus according to the preferred embodiment of the present invention.
Figure 2:
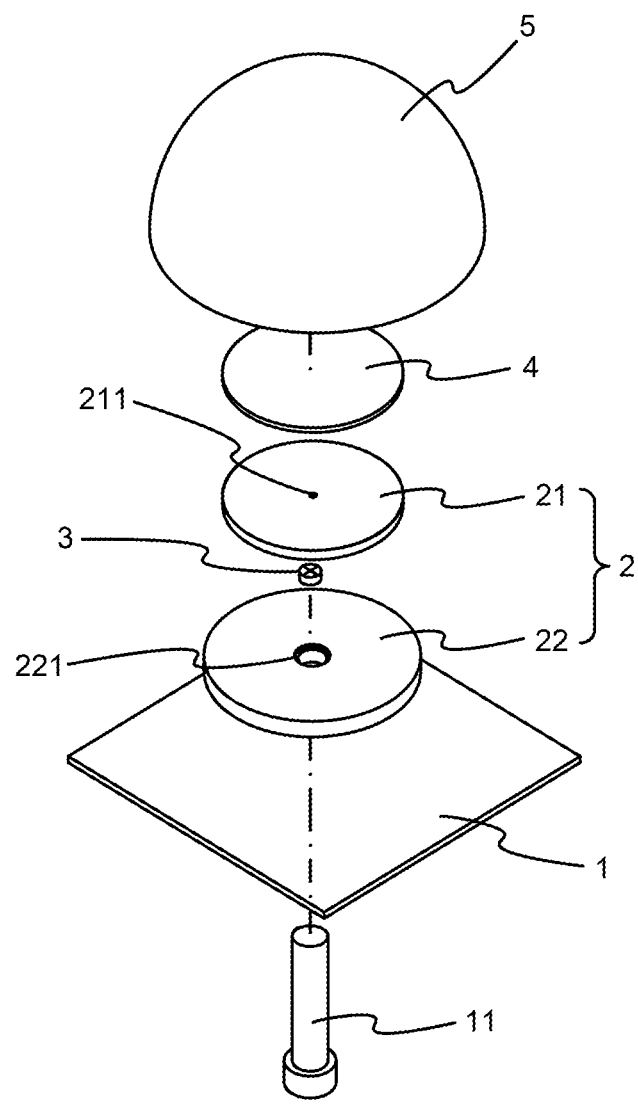
FIG. 2 is an exploded view of the sun-locating apparatus shown in FIG. 1.
Figure 3:
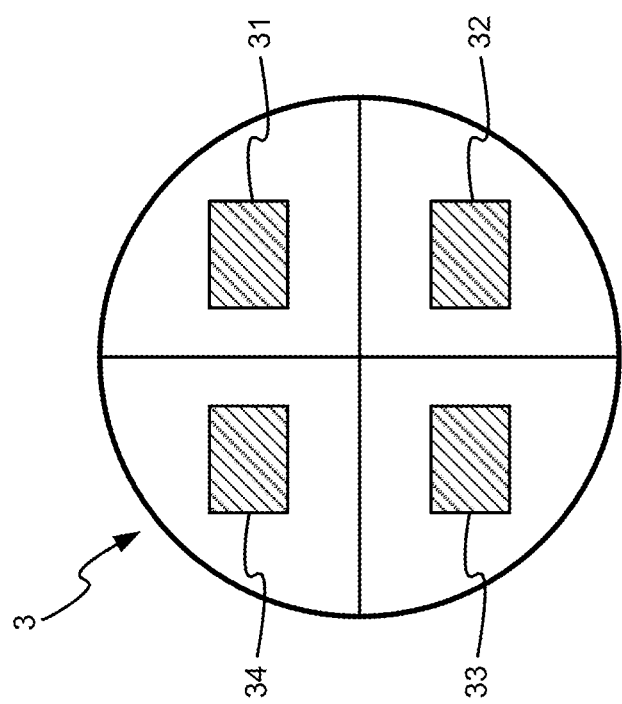
FIG. 3 is a top view of a photo-detecting unit of the sun-locating apparatus shown in FIG. 1.
Figure 4:
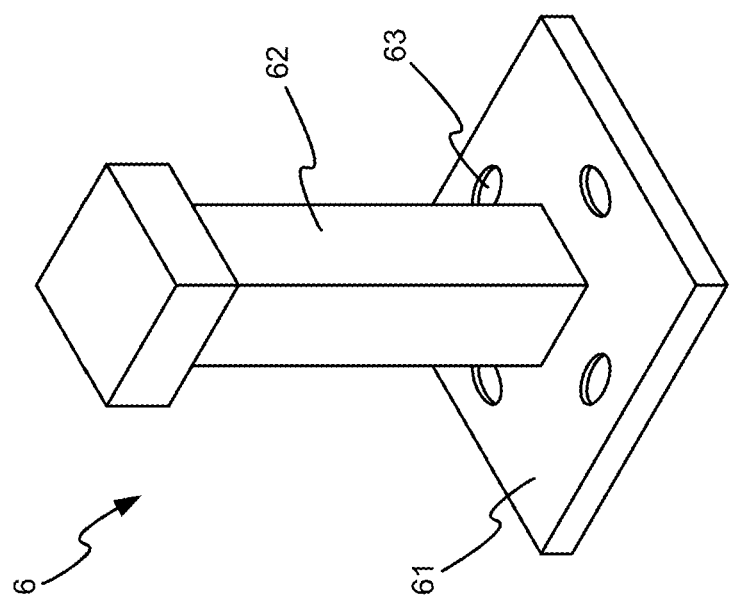
FIG. 4 is a perspective view of a conventional sun-locating apparatus.

Referring to FIGS. 1 and 2, there is shown a sun position-detecting apparatus in accordance with the preferred embodiment of the present invention. The sun position-detecting apparatus includes a substrate 1, a mounting unit 2, a photo-detecting unit 3, an optical element 4 and a cover 5.

The substrate 1 may be a circuit board provided with a predetermined circuit layout. A signal-transmitting wire 11 is connected to a lower face of the substrate 1. The signal-transmitting wire 11 transmits a bias to the photo-detecting unit 3. Furthermore, the signal-transmitting wire 11 transmits a photocurrent-related signal to a controller (not shown) from the photo-detecting unit 3.

The mounting unit 2 includes an upper disc 21 and a lower disc 22. The upper disc 21 includes an aperture 211 defined therein centrally. The lower disc 22 includes an aperture 221 defined therein centrally. The upper disc 21 is located on and attached to the lower disc 22 so that the aperture 211 is in communication with the aperture 221. The diameter of the aperture 211 may be 1.5 mm.

The photo-detecting unit 3 includes four photodiodes 31, 32, 33 and 34. The photodiodes 31, 32, 33 and 34 are located in four phases relative to the center of the photo-detecting unit 3. The photodiodes 31, 32, 33 and 34 are substantially identical to one another regarding their photoelectric properties. The photo-detecting unit 3 is located in the aperture 221 before the upper disc 21 is attached to the lower disc 22. Thus, the photo-detecting unit 3 is kept in the cavity 221. It should be noted that an upper face of the photo-detecting unit 3 extends parallel to that of the substrate 1. The photo-detecting unit 3 may be attached to the substrate 1 by soldering for example. The diameter of the photo-detecting unit 3 is about twice as long as that of aperture 211.

The optical element 4 is provided on the mounting unit 2 so that the center of the optical element 4 is aligned with the center of the aperture 211 of the mounting unit 2. The optical element 4 prevents contaminants from reaching the photo-detecting unit 3 through the aperture 211 but allows sun light to reach the photo-detecting unit 3 through the aperture 211. The optical element 4 may be a concentration lens.

The cover 5 is provided on and attached to the substrate 1 for covering and protecting the mounting unit 2, the photo-detecting unit 2 and the optical element 4 from water, moisture and/or hits. The cover 5 is preferably a hemi-spherical transparent element.

As the sun light is cast on the sun-locating apparatus, a light beam is cast through the aperture 211 so that a light spot is cast on the photo-detecting unit 3. An output current from each of the photodiodes 31, 32, 33 and 34 is determined by an area ("light-intercepting area") thereof on which the sun light is cast. Thus, the light spot is located. The position of the light spot is moved on the photo-detecting unit 3 as the sun-locating apparatus is moved relative to the sun. Thus, light-intercepting area of each of the photodiodes 31, 32, 33 and 34 is changed, and so is the output current. Thus, an array of solar cells of a photovoltaic system equipped with the sun-locating apparatus is moved. Eventually, the output currents from the photodiodes 31, 32, 33 and 34 are identical to one another. Now, the light spot is cast at the center of the photo-detecting unit 3. That is, the array of solar cells is aligned with the sun. The photodiodes 31, 32, 33 and 34 are integrated on a circuit board for example so that differences between them are smaller than the differences between the photodiodes 63 of the conventional sun-locating apparatus 6 addressed in the Related Prior Art. Hence, the sun-locating apparatus of the present invention operates at increased precision than the conventional sun-locating apparatus 6 addressed in the Related Prior Art. Moreover, for using a light spot instead of the shadow of the post 62, the sun-locating apparatus of the present invention operates at increased precision than the conventional sun-locating apparatus 6 addressed in the Related Prior Art and particularly so when the sun light is weak. Furthermore, for using the aperture 211 to produce a light spot instead of the post 62 to produce a shadow, the size of the sun-locating apparatus of the present invention is smaller than the size of the conventional sun-locating apparatus of the conventional sun-locating apparatus 6 addressed in the Related Prior Art. The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A sun-locating apparatus including:
   a substrate;
   a mounting unit mounted on the substrate and comprising an upper aperture and a lower aperture in communication with the upper aperture;
   a photo-detecting unit arranged in the lower aperture and including at least four photodiodes arranged such that incident light can pass through the upper aperture so as to impinge the at least four photodiodes;
   an optical element mounted on the mounting unit so as to cover at least the upper aperture; and
   a cover mounted on the substrate so as to cover the mounting unit, the photo-detecting unit and the optical element.

2. The sun-locating apparatus according to claim 1, wherein the substrate is a circuit board formed with a circuit layout.

3. The sun-locating apparatus according to claim 1, further including a signal-transmitting wire connected to the substrate.

4. The sun-locating apparatus according to claim 1, wherein the mounting unit includes an upper disc and a lower disc arranged beneath the upper disc and wherein the upper aperture is defined in the upper disc and the lower aperture is defined in the lower disc.

5. The sun-locating apparatus according to claim 1, wherein the upper aperture is made with a diameter of 1.5 mm.

6. The sun-locating apparatus according to claim 1, wherein the photo-detecting unit is made with a diameter twice that of the upper aperture.

7. The sun-locating apparatus according to claim 1, wherein the photodiodes are substantially identical to one another regarding their photoelectric properties.

8. The sun-locating apparatus according to claim 1, wherein the optical element is a concentration lens.

9. The sun-locating apparatus according to claim 1, wherein the cover is made of a transparent material.

\* \* \* \* \*